United States Patent [19]
Small

[11] Patent Number: 6,000,340
[45] Date of Patent: Dec. 14, 1999

[54] ROCKET LAUNCHING SYSTEM EMPLOYING THERMAL-ACOUSTIC DETECTION FOR ROCKET IGNITION

[75] Inventor: James G. Small, Tucson, Ariz.

[73] Assignee: Raytheon Company, Lexington, Mass.

[21] Appl. No.: 08/902,893

[22] Filed: Jul. 30, 1997

Related U.S. Application Data

[60] Provisional application No. 60/034,688, Jan. 7, 1997.

[51] Int. Cl.⁶ ................................................. F43B 15/10
[52] U.S. Cl. ............................................................. 102/380
[58] Field of Search ................................... 102/380, 206; 89/6.5

[56] References Cited

U.S. PATENT DOCUMENTS

| | | | |
|---|---|---|---|
| 2,912,903 | 11/1959 | Crothers | 102/380 |
| 3,982,467 | 9/1976 | Smith et al. | 102/380 |
| 4,644,864 | 2/1987 | Komorowski et al. | 102/206 |
| 4,712,465 | 12/1987 | Macdonald | 102/380 |
| 4,739,705 | 4/1988 | Hodson et al. | 102/206 |
| 5,537,909 | 7/1996 | Schneider et al. | 102/293 |

*Primary Examiner*—Charles T. Jordan
*Assistant Examiner*—Theresa M. Wesson
*Attorney, Agent, or Firm*—David W. Collins; Leonard A. Alkov; Glenn H. Lenzen, Jr.

[57] ABSTRACT

A rocket launching system employing ignition apparatus that is used with a small rocket to launch the rocket from a gun. The rocket is equipped with acoustic (pressure) and optical (thermal) sensors that detect a pressure pulse and light flash of a primer charge used to fire the gun. The simultaneous detection of the pressure pulse and the light flash by the sensors generates output signals that are used to complete an electrical circuit in an electronic ignition circuit that activates an igniter that ignites a rocket motor.

3 Claims, 1 Drawing Sheet

ROCKET LAUNCHING SYSTEM EMPLOYING THERMAL-ACOUSTIC DETECTION FOR ROCKET IGNITION

This application claims priority from provisional application Ser. No. 60/034,688, docket No. PD-960469, filed Jan. 7, 1997.

BACKGROUND

The present invention relates generally to rocket ignition systems, and more particularly, to a rocket launching system employing a thermal-acoustic rocket ignition system that may be used to launch a rocket from a gun or howitzer.

For many practical reasons, including safe arming practices and a preferred use of electrical fire control circuits, it is desirable to use electrical ignition for small rockets. However, army gunners fire howitzers by pulling a lanyard to activate a mechanical firing pin that fires a percussion primer charge. It is not practical to run connecting wires through breech mechanisms of howitzers, which would typically be required to electrically ignite a rocket.

Currently, military field artillery personnel find targets and assess damage using a forward observer. The forward observer is typically a soldier or small team of soldiers who are placed on the ground in enemy territory to observe potential targets. Using radio, the forward observer reports potential targets and map coordinates to a friendly artillery fire direction center. Disadvantages of using a forward observer include the extreme danger to personnel and the difficulty of getting a forward observer to a critical area in a timely fashion.

Alternatively, a manned aircraft or unmanned aerial vehicle may be used to spot targets for artillery fire. One disadvantage of aircraft and unmanned aerial vehicles is that they are not controlled by the field artillery personnel and may not be available when needed for artillery operations. Aircraft and unmanned aerial vehicles are also noisy, are usually low flying, and are easily detected by hostile forces. Flying an aircraft into hostile territory puts the pilot and other aircraft personnel at high risk. Also, both aircraft and unmanned aerial vehicles are relatively expensive to operate.

The assignee of the present invention has developed an artillery round in the form of an unmanned rocket that houses optical sensors that may be used to observe a battlefield, for example. This artillery round is designed to be carried by field artillery personnel as part of a normal ordnance load. This artillery round will therefore be available to field artillery personnel wherever ammunition is available. This artillery round is a small, silent, unmanned vehicle that glides over hostile target areas, cannot be heard and is difficult to see. The artillery round has a very low cost compared with aircraft and larger engine-powered unmanned aerial vehicles, and puts no personnel at risk.

However, there is a need for a simple means of launching the artillery round (or unmanned rocket) from field-deployed devices. The present invention is intended to meet this need. Accordingly, it is an objective of the present invention to provide for a rocket launching system employing a thermal-acoustic rocket ignition system that may be used to launch a rocket from a gun or howitzer.

SUMMARY OF THE INVENTION

To meet the above and other objectives, the present invention provides for a rocket launching system employing ignition apparatus that is used with a small rocket to launch the rocket from a gun, such as a howitzer or naval ship gun, for example. The rocket is equipped with acoustic (pressure) and optical (thermal) sensors that detect a pressure pulse and light flash of a primer charge used to fire the gun. The simultaneous detection of the pressure pulse and the light flash by the sensors generates output signals that are used to complete an electrical circuit in an electronic ignition circuit that activates an igniter that ignites a rocket motor. In accordance with the present invention, the gun may be fired to launch the rocket in a normal manner without modification of its breech to route electrical conductors from the rocket to an external firing circuit. The present invention thus provides a practical means for launching the rocket from a howitzer or gun.

The rocket may be safely fired from a howitzer or gun by using the optical and pressure (percussive) sensors. The rocket is equipped with on-board pressure and optical sensors that detect the pressure pulse and thermal flash associated with the ignition of the primer charge. In operation, a rocket is loaded into a firing chamber of the gun. The breech of the gun is closed and the primer charge mechanically fired. When the acoustic and optical sensors simultaneously detect ignition of the primer, an electrical circuit in the rocket is activated to electrically ignite the rocket motor and launch the rocket.

Thus, the present invention provides a practical firing mechanism for howitzer- and gun-launched rockets. The present invention allows the unmanned rocket to be fired exactly like any other howitzer munition, which gives it large utility for users.

BRIEF DESCRIPTION OF THE DRAWINGS

The various features and advantages of the present invention may be more readily understood with reference to the following detailed description taken in conjunction with the accompanying drawings, wherein like reference numerals represent like structural elements, and in which.

DETAILED DESCRIPTION

Figure 1:
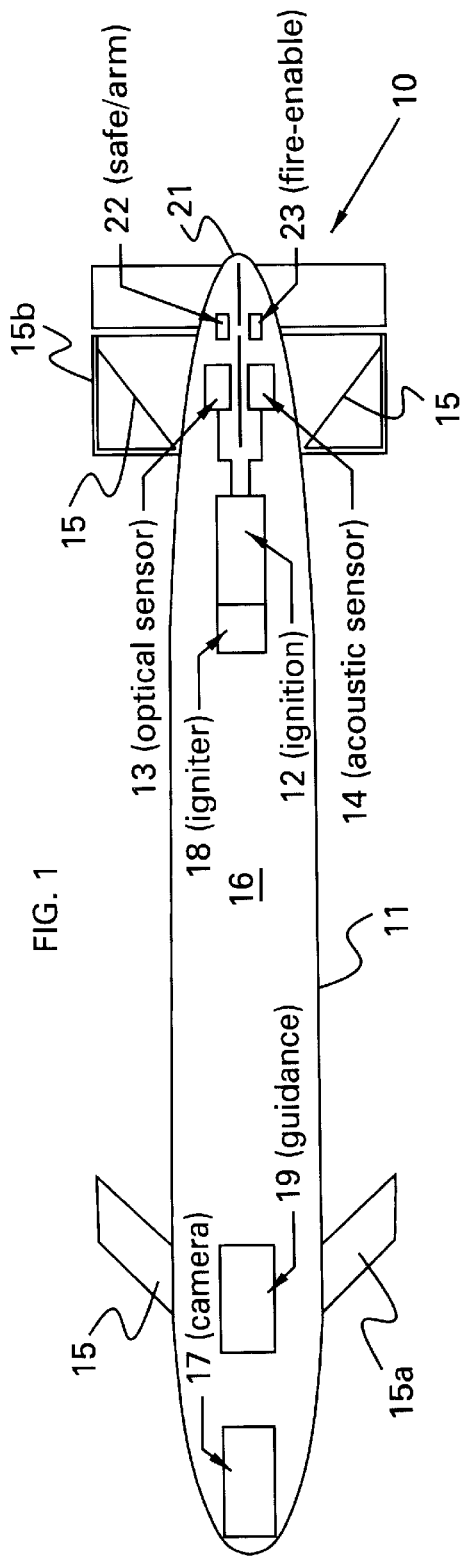
FIG. 1 illustrates an artillery projectile in accordance with the principles of the present invention that may be fired from a howitzer or gun.
Figure 2:
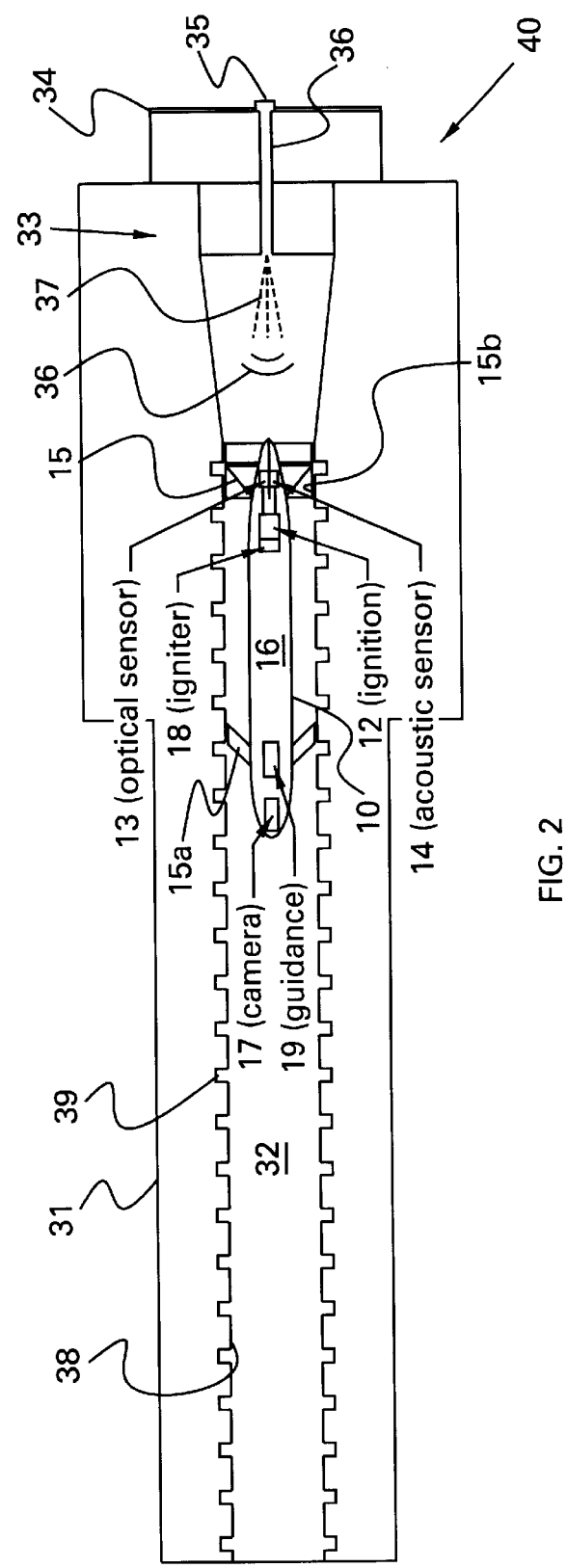
FIG. 2 illustrates a rocket launching system in accordance with the principles of the present invention.

Referring to the drawing figures, FIG. 1 illustrates an artillery projectile 10 in accordance with the principles of the present invention that may be fired from a howitzer 30 or gun 30 (shown in FIG. 2). The combination of the artillery projectile 10 and the gun 30 forms a rocket launching system 40 in accordance with the principles of the present invention.

The artillery projectile 10 comprises a housing 11 that encloses an electronic ignition circuit 12, an optical sensor 13, an acoustic sensor 14, a smokeless rocket motor 16, a camera 17, and a global positioning system (GPS) guidance system 19. A plurality of folding wings 15 or aft tail surfaces 15 are disposed around an aft portion of the artillery projectile 10. The folding wings 15 or aft tail surfaces 15 provide for aerodynamic guidance of the artillery projectile 10. A plurality of fin projections 15a are disposed around a front portion of the artillery projectile 10 that assist in locating the artillery projectile 10 in the gun 30 from which it is launched. A circumferential guide ring 15b surrounds the aft tail surfaces 15 and interconnects them at their outer radial ends. The width of the guide ring 15b is substantially identical to the width of the aft tail surfaces 15. The guide ring 15b and fin projections 15a are used to center the projectile 10 in the bore 38 of the gun 30.

The basic artillery projectile 10, which excludes the rocket motor 16 and its electronic ignition circuit 12 and sensors 13, 14 employed in the present invention, is disclosed in U.S. Pat. No. 5,537,909 entitled "All Aspect Bomb Damage Assessment System", issued Jul. 23, 1996, which is assigned to the assignee of the present invention. The basic artillery projectile 10 disclosed in this patent is a glider that is not powered as in the present invention, and which contains an imaging system that is carried by an air-to-ground weapon and released prior to weapon impact and which provides imagery of a target area before, during and after weapon delivery.

In the present artillery projectile 10, the optical sensor 13 and acoustic sensor 14 are coupled to the electronic ignition circuit 12. The electronic ignition circuit 12 is coupled to an igniter 18 that is used to ignite the smokeless rocket motor 16. The optical sensor 13 is used to detect a substantially simultaneous occurrence of a pressure pulse and a flash of light from a primer charge that is used to fire the artillery projectile 10 from the gun 30, as will be discussed in more detail with reference to FIG. 2.

The artillery projectile 10 is an expendable imaging device that operates as an autonomous and expendable flying sensor. The artillery projectile 10 comprises a small glider having folding wings 15 that is packaged as a 155 millimeter diameter artillery round. The artillery projectile 10 is launched from a cannon 30 or gun 30 (FIG. 2) and is boosted by the smokeless rocket motor 16 along a rocket-propelled trajectory. When the rocket motor 16 burns out and the artillery projectile 10 reaches apogee, the in-flight projectile 10 deploys its wings 15 and glides to a target area. Once over the target area, the artillery projectile 10 activates the camera 17 and transmits imagery of the target area for battle damage assessment or prestrike reconnaissance.

The expendable battle damage assessment sensor provided by the artillery projectile 10 has a length of about 50 cm (20 inches), a weight of about 3.6 kg (8 pounds), has an air speed of about 50 m/s (100 knots), and navigates using the global positioning system. The artillery projectile 10 has no engine, no fuel, no maintenance, no pilot, and has a relatively low cost.

The present artillery projectile 10 extends the technology disclosed in U.S. Pat. No. 5,537,909 to provided a howitzer-launched projectile 10, as shown in FIG. 2. More specifically, FIG. 2 illustrates a rocket launching system 40 in accordance with the principles of the present invention for launching the projectile 10 shown in FIG. 1. The gun 30 is conventional, and has a gun tube 31 with an internal bore 32 that ends at a breech 33. The internal bore 32 of the gun tube 31 has lands and grooves 38, 39 therein. A breech block 34 is disposed at an aft end of the gun tube 31. A percussion primer 35 is disposed at an end of a through hole 36 that extends through the breech block 34 to the breech 33.

The artillery projectile 10 is launched using the smokeless rocket motor 16 instead of conventional gun propellant. Rocket boost derived from the smokeless rocket motor 16 reduces launch acceleration from about 25,000 g's for a typical gun to a manageable 30 g's. Use of the smokeless rocket motor 16 allows the use of low-cost commercial components in the projectile 10 which need not be gun-hardened. The resulting cost of the projectile 10 is relatively low and therefore it is expendable. No recovery or refurbishment is required, which saves further operational costs.

To fire the artillery projectile 10, a gun crew opens a storage canister (not shown) and removes the artillery projectile 10. A fire-enable safety switch 23 is activated. The artillery projectile 10 is loaded into the gun breech 23. The guide ring 15b is seated on the lands 38 and grooves 39. Forward obturation (a gas seal) is not required since the artillery projectile 10 is rocket powered. A safe/arm circuit 22 is activated and a protective tail cone 21 is removed by pulling a lanyard (not shown).

The breech block 24 is closed. The gun 30 is elevated and traversed. Launch is initiated by pulling a lanyard to detonate the conventional percussion primer 35. The optical and pressure sensors 13, 14 on the artillery projectile 10 detect the simultaneous pressure pulse and light flash from the primer 35. Logic contained in the firing circuit 12 begins the rocket ignition sequence. The rocket motor 16 is fired electrically in about 1 second. When the artillery projectile 10 arrives over the target area, as determined by its GPS coordinates, it transmit imagery generated by the camera 17.

Thus, a rocket launching system employing a thermal-acoustic rocket ignition system that may be used to launch a rocket from a gun or howitzer has been disclosed. It is to be understood that the described embodiment is merely illustrative of some of the many specific embodiments which represent applications of the principles of the present invention. Clearly, numerous and other arrangements can be readily devised by those skilled in the art without departing from the scope of the invention.

What is claimed is:

1. A rocket launching system for launching a projectile, said system comprising:

a gun comprising:
      a gun tube having an internal bore;
      a breech disposed adjacent an aft end of the gun tube;
      a breech block disposed at an aft end of the gun tube; and
      a percussion primer disposed in the breech block; and a projectile having a housing that comprises:
      a plurality of folding wings disposed around the periphery of the housing;
      a rocket motor;
      an electronic ignition circuit;
      an optical sensor coupled to the electronic ignition circuit;
      an acoustic sensor coupled to the electronic ignition circuit;
      an igniter coupled to the electronic ignition circuit for igniting the rocket motor; and
      a global positioning system guidance system;

and wherein the acoustic and optical sensors detect a substantially simultaneous occurrence of a pressure pulse and a flash of light from a primer charge that is used to fire the projectile from the gun, and wherein output signals derived from the acoustic and optical sensors activate the electronic ignition circuit which activates the igniter to launch the projectile.

2. The rocket launching system of claim 1 wherein the projectile further comprises a camera.

3. A ignition system for launching a projectile from a gun having a percussion primer, said system comprising:

a projectile comprising a rocket motor, an electronic ignition circuit, an optical sensor coupled to the elec tronic ignition circuit, an acoustic sensor coupled to the electronic ignition circuit, and an igniter coupled to the electronic ignition circuit for igniting the rocket motor in response to output signals derived from both the optical and acoustic sensors;

and wherein the acoustic and optical sensors detect a substantially simultaneous occurrence of a pressure pulse and a flash of light from a primer charge that is used to fire the projectile from the gun, and wherein output signals derived from the acoustic and optical sensors activate the electronic ignition circuit which activates the igniter to launch the projectile.

* * * * *